United States Patent
Yamate

(10) Patent No.: US 12,163,062 B2
(45) Date of Patent: Dec. 10, 2024

(54) TWO-COMPONENT ADHESIVE COMPOSITION

(71) Applicant: NIPPON SODA CO., LTD., Tokyo (JP)

(72) Inventor: Taiki Yamate, Chiba (JP)

(73) Assignee: NIPPON SODA CO., LTD., Tokyo (JP)

(*) Notice: Subject to any disclaimer, the term of this patent is extended or adjusted under 35 U.S.C. 154(b) by 169 days.

(21) Appl. No.: 17/913,710

(22) PCT Filed: Apr. 1, 2021

(86) PCT No.: PCT/JP2021/014129
§ 371 (c)(1),
(2) Date: Sep. 22, 2022

(87) PCT Pub. No.: WO2021/201207
PCT Pub. Date: Oct. 7, 2021

(65) Prior Publication Data
US 2023/0118487 A1    Apr. 20, 2023

(30) Foreign Application Priority Data
Apr. 3, 2020 (JP) ................ 2020-067496

(51) Int. Cl.
C09J 179/02 (2006.01)
C09J 11/06 (2006.01)
C09J 11/08 (2006.01)

(52) U.S. Cl.
CPC ............ *C09J 179/02* (2013.01); *C09J 11/06* (2013.01); *C09J 11/08* (2013.01); *C09J 2301/408* (2020.08); *C09J 2400/226* (2013.01)

(58) Field of Classification Search
CPC .......... C09J 179/02; C09J 11/06; C09J 11/08; C09J 2301/408; C09J 2400/226; C09J 2433/00; C09J 4/06; C09J 7/30; C09J 109/00; C09J 4/00; C08F 4/40; C08F 220/54; C08F 265/10; C08L 9/00; C08L 9/02; C08L 9/06; C08L 33/26; C08K 5/14
See application file for complete search history.

(56) References Cited

U.S. PATENT DOCUMENTS

| 5,328,947 | A | 7/1994 | Taguchi et al. |
| 11,834,390 | B2* | 12/2023 | Yamate ............... C08J 7/042 |
| 2021/0284879 | A1 | 9/2021 | Yamate |
| 2021/0347726 | A1 | 11/2021 | Yamate |

FOREIGN PATENT DOCUMENTS

| JP | 2019-143063 | | 8/2019 |
| TW | 201313861 | A | 4/2013 |
| WO | 2018/070079 | | 4/2018 |
| WO | WO-2019198792 | A1* | 10/2019 |
| WO | 2020/071456 | | 4/2020 |

OTHER PUBLICATIONS

Official Communication issued in International Patent Application No. PCT/JP2021/014129, dated Jul. 6, 2021, along with English translation.

* cited by examiner

*Primary Examiner* — Christopher W Raimund
(74) *Attorney, Agent, or Firm* — GREENBLUM & BERNSTEIN, P.L.C.

(57) ABSTRACT

An adhesive composition is provided and includes the following components (A) to (D): (A) a radically polymerizable compound; (B) (B-1) a polymer consisting of at least one repeat unit derived from a polymerizable compound of formula (I), or (B-2) a polymer consisting of at least one repeat unit derived from a polymerizable compound of formula (I), and at least one repeat unit derived from another radically polymerizable compound; (C) a polymerization initiator; and (D) a reducing agent.

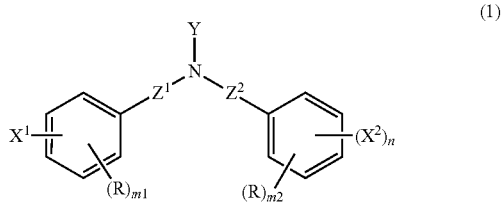

(1)

5 Claims, No Drawings

TWO-COMPONENT ADHESIVE COMPOSITION

TECHNICAL FIELD

The present invention relates to a two-component adhesive composition. The present application claims the priority based on Japanese Patent Application No. 2020-067496 filed on Apr. 3, 2020, the contents of which are incorporated herein by reference.

BACKGROUND ART

Effective adhesive agents have been required which may attain, with one agent, balanced adhesion of various plastic resins such as low-surface energy resin base materials, for example, polyethylene (PE), polypropylene (PP), polytetrafluoroethylene (PTFE), polyacetal (POM), nylon 6 (PA6), polyethylene terephthalate (PET), polybutylene terephthalate (PBT), polydimethylsilicone (PDMS), polyether ether ketone (PEEK), modified polyphenylene ether (PPE), polyphenylene sulfide (PPS), cycloolefin polymer (COP), cycloolefin copolymer (COC), polymethylpentene (PMP), and liquid crystal polyester (LCP), or high-surface energy resin base materials, for example, polyvinyl chloride (PVC), polycarbonate (PC), and polymethyl methacrylate (PMMA). Such low-surface energy plastics are well known to be difficult to bond.

The adhesion of these difficult-to-bond base materials often requires surface treatment such as flame treatment, ITRO treatment, corona discharge, plasma treatment, oxidation with ozone or an oxidizing acid, or sputter etching. Although the surface of the difficult-to-bond base materials may be coated with primers containing a high-surface energy material, the surface treatment may be required for sufficient attachment of the primers. Thus, the adhesion of the difficult-to-bond base materials often requires complicated and expensive treatment, and even such treatment may not produce sufficient adhesive force.

Meanwhile, two-component base agent acrylic adhesive agents called second generation acrylic adhesive compositions (SGA) are excellent in workability because these adhesive agents do not require accurate gauging of two agents and are cured at ordinary temperature in several minutes to several tens of minutes by mere contact of two agents even if the two agents are insufficiently gauged or mixed. Furthermore, because of high peel strength and impact strength and favorable curing of even protrusions, SGA is widely used from electric and electronic component fields to civil engineering and construction fields. Low-odor SGA has also emerged recently and permits work even in locations with insufficient ventilation equipment.

However, the conventional two-component acrylic adhesive agents (SGA) have difficulty in attaining adhesion of a wide range of plastic resins from low-surface energy to high-surface energy plastic resins with one agent of the adhesive agent.

For example, patent document 1 discloses a two-component acrylic adhesive agent (SGA) having an alkyl-borane complex as an initiator.

PRIOR ART DOCUMENTS

Patent Document

Patent Document 1: Japanese unexamined Patent Application Publication No. 2019-143063

SUMMARY OF THE INVENTION

Object to be Solved by the Invention

Problems of acrylic adhesive agents comprising a polymerization initiator system based on an organic boron-amine complex, as disclosed in patent document 1 are that the adhesive agents cannot attain adhesion of PA6, POM or the like, cannot attain adhesion of large areas due to a short usable time, and must be refrigerated, for example.

An object of the present invention is to provide a two-component adhesive composition that may attain, with one agent, balanced adhesion of various plastic resins such as low-surface energy resin base materials, for example, polyethylene (PE), polypropylene (PP), polytetrafluoroethylene (PTFE), polyacetal (POM), nylon 6 (PA6), polyethylene terephthalate (PET), polybutylene terephthalate (PBT), polydimethylsilicone (PDMS), polyether ether ketone (PEEK), modified polyphenylene ether (PPE), polyphenylene sulfide (PPS), cycloolefin polymer (COP), cycloolefin copolymer (COC), polymethylpentene (PMP), and liquid crystal polyester (LCP), or high-surface energy resin base materials, for example, polyvinyl chloride (PVC), polycarbonate (PC), and polymethyl methacrylate (PMMA).

Means to Solve the Object

The present invention encompasses the following aspects.
(1) An adhesive composition comprising the following components (A) to (D):
(A) a radically polymerizable compound;
(B)
(B-1) a polymer consisting of at least one repeat unit derived from a polymerizable compound of formula (I), or
(B-2) a polymer consisting of at least one repeat unit derived from a polymerizable compound of formula (I), and at least one repeat unit derived from another radically polymerizable compound:

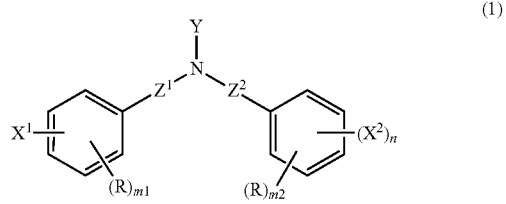

(wherein $X^1$ and $X^2$ each independently represent a C7 to C20 alkyl group or a C7 to C20 alkoxy group, n represents 0 or 1, $Z^1$ and $Z^2$ each independently represent a single bond or a C1 to C3 alkylene group, each R independently represents an organic group or a halogeno group, m1 and m2 each independently represent any integer of 0 to 4, and Y represents a polymerizable functional group);
(C) a polymerization initiator; and
(D) a reducing agent.
(2) The adhesive composition according to (1), wherein the polymerization initiator is cumene hydroperoxide.
(3) The adhesive composition according to (1) or (2), wherein the reducing agent is at least one compound selected from the group consisting of vanadyl acetylacetonate, cobalt octylate, cobalt naphthenate and ethylenethiourea.

(4) The adhesive composition according to any one of (1) to (3), wherein the adhesive composition further comprises polybutadiene.
(5) The adhesive composition according to any one of (1) to (4), wherein the adhesive composition consists of a mixture of a first agent containing at least the component (C) and a second agent containing at least the component (D).
(6) A compact obtained by applying an adhesive composition according to any one of (1) to (5) onto a plastic base material, and curing the adhesive composition so that the resulting layer is disposed on the base material or between base materials.

Effect of the Invention

The present invention may provide two-component adhesive composition that may attain, with one agent, balanced adhesion of various plastic resins such as low-surface energy resin base materials, for example, polyethylene (PE), polypropylene (PP), polytetrafluoroethylene (PTFE), polyacetal (POM), nylon 6 (PA6), polyethylene terephthalate (PET), polybutylene terephthalate (PBT), polydimethylsilicone (PDMS), polyether ether ketone (PEEK), modified polyphenylene ether (PPE), polyphenylene sulfide (PPS), cycloolefin polymer (COP), cycloolefin copolymer (COC), polymethylpentene (PMP), and liquid crystal polyester (LCP), or high-surface energy resin base materials, for example, polyvinyl chloride (PVC), polycarbonate (PC), and polymethyl methacrylate (PMMA).

MODE OF CARRYING OUT THE INVENTION

Hereinafter, embodiments of the present invention will be described in detail.

The adhesive composition of the present invention comprises at least components (A) to (D) given below.

However, these components are separated in two agents before use as an adhesive agent, and the two agents are mixed immediately before or during application to a base material, thereby forming the adhesive composition of the present invention. In short, the adhesive composition of the present invention consists of a mixture of a first agent containing at least the component (C) and a second agent containing at least the component (D).

<Component (A): Radically Polymerizable Compound>

The radically polymerizable compound (1) used in the present invention refers to a compound having at least one or more radically polymerizable groups in the molecule. Any radically polymerizable compound has the chemical form of a liquid or solid monomer, oligomer or polymer at ordinary temperature and ordinary pressure.

As examples of such a radically polymerizable compound, unsaturated carboxylic acid such as acrylic acid, methacrylic acid, itaconic acid, crotonic acid, isocrotonic acid, and maleic acid and a salt, ester, acid amide or acid anhydride thereof;
(meth)acrylonitrile;
a styrene such as styrene, p-hydroxystyrene, p-chlorostyrene, p-bromostyrene, p-methylstyrene, p-methoxystyrene, p-t-butoxystyrene, and p-t-butoxycarbonylstyrene;
other vinyl compounds such as vinyl acetate, vinyl monochloroacetate, vinyl benzoate, vinyl pivalate, vinyl butyrate, vinyl laurate, divinyl adipate, vinyl methacrylate, vinyl crotonate, and vinyl 2-ethylhexanoate;
an olefin compound such as ethylene, propylene, and butadiene;
their oligomers, polymers or the like is exemplified.

Among these radically polymerizable components, a (meth)acrylic acid is preferred.

The (meth)acrylic acid means an "acrylic acid" or a "methacrylic acid". The (meth)acrylic acid of the present invention includes monofunctional or polyfunctional (meth)acrylic acid, (meth)acrylate ((meth)acrylic acid ester), (meth)acrylamide, (meth)acrylonitrile and their oligomers and polymers.

Among the (meth)acrylic acids, (meth)acrylate is preferred, and monofunctional (meth)acrylate having one (meth)acryloyl group is more preferred.

The monofunctional (meth)acrylate is preferably one or more members selected from the group consisting of alkyl (meth)acrylate, alicyclic acrylate, (meth)acrylate having an ether skeleton, (meth)acrylate having a cyclic ether skeleton, and (meth)acrylate having an aromatic group.

The monofunctional (meth)acrylate will be listed below.

As the alkyl (meth)acrylate, methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, 2-ethylhexyl (meth)acrylate, isooctyl (meth)acrylate, lauryl (meth)acrylate, stearyl (meth)acrylate, isononyl (meth)acrylate or the like is exemplified. One or more of these compounds may be used.

The alicyclic (meth)acrylate is preferably (meth)acrylate having an alicyclic hydrocarbon group. As the (meth)acrylate having an alicyclic hydrocarbon group, cyclohexyl (meth)acrylate, dicyclopentanyl (meth)acrylate, dicyclopentenyl (meth)acrylate, dicyclopentenyloxyethyl (meth)acrylate, isobornyl (meth)acrylate, or methoxylated cyclodecatriene (meth)acrylate is exemplified. One or more of these compounds may be used.

As the (meth)acrylate having an ether skeleton, 2-methoxyethyl (meth)acrylate, 2-ethoxyethyl (meth)acrylate, or diethylene glycol monomethyl ether (meth)acrylate is exemplified. One or more of these compounds may be used.

As the (meth)acrylate having a cyclic ether skeleton, glycidyl (meth)acrylate, furfuryl (meth)acrylate, tetrahydrofurfuryl (meth)acrylate, 3-ethyl-3-oxetanylmethyl (meth)acrylate, (2-methyl-ethyl-1,3-dioxolan-4-yl)methyl (meth)acrylate, cyclic trimethylolpropane formal (meth)acrylate, γ-butyrolactone (meth)acrylate, dioxolane (meth)acrylate, oxetane (meth)acrylate or the like is exemplified. One or more of these compounds may be used.

As the (meth)acrylate having an aromatic group, phenyl (meth)acrylate, benzyl (meth)acrylate, methylbenzyl (meth)acrylate, ethylbenzyl (meth)acrylate, propylbenzyl (meth)acrylate, methoxybenzyl (meth)acrylate, phenoxyethyl (meth)acrylate, chlorobenzyl (meth)acrylate, nonylphenoxy polyethylene glycol (meth)acrylate or the like is exemplified. One or more of these compounds may be used.

The polyfunctional (meth)acrylate will be listed below.

The polyfunctional (meth)acrylate is a compound having two or more (meth)acrylate groups in the molecule. For example, difunctional (meth)acrylate such as neopentyl glycol di(meth)acrylate, stearic acid-modified pentaerythritol di(meth)acrylate, dicyclopentenyl diacrylate, di(meth)acryloyl isocyanurate, alkylene oxide-modified bisphenol di(meth)acrylate, 2,2-bis(4-(meth)acryloxyphenyl)propane, 2,2-bis(4-(meth)acryloxyethoxyphenyl)propane, 2,2-bis(4-(meth)acryloxydiethoxyphenyl)propane, 2,2-bis(4-(meth)acryloxypropoxyphenyl)propane, 2,2-bis(4-(meth)acryloxytetraethoxyphenyl)propane, and 2,2-bis(4-(meth)

acryloxypolyethoxyphenyl)propane; and trifunctional or higher (meth)acrylate such as trimethylolpropane tri(meth)acrylate, pentaerythritol tri(meth)acrylate, tris(acryloyloxyethyl) isocyanurate, ditrimethylolpropane tetra(meth)acrylate, pentaerythritol tetra(meth)acrylate, dipentaerythritol monohydroxy penta(meth)acrylate, alkyl-modified dipentaerythritol pentaacrylate, and dipentaerythritol hexa(meth)acrylate are exemplified. One or more of these compounds may be used.

As the (meth)acrylate oligomer, urethane (meth)acrylate of a polybutadiene skeleton, urethane (meth)acrylate of a hydrogenated polybutadiene skeleton, urethane (meth)acrylate of a polycarbonate skeleton, urethane (meth)acrylate of a polyether skeleton, urethane (meth)acrylate of a polyester skeleton, urethane (meth)acrylate of a castor oil skeleton, isoprene (meth)acrylate, hydrogenated isoprene (meth)acrylate, epoxy (meth)acrylate oligomer or the like is exemplified. One or more of these compounds may be used.

As the (meth)acrylamide, methyl(meth)acrylamide, dimethyl(meth)acrylamide, ethyl(meth)acrylamide, hydroxyethyl(meth)acrylamide, diethyl(meth)acrylamide, n-propyl(meth)acrylamide, dipropyl(meth)acrylamide, diisopropyl(meth)acrylamide, isopropylacrylamide, n-butyl(meth)acrylamide, i-butyl(meth)acrylamide, n-hexyl(meth)acrylamide, 2-ethylhexyl(meth)acrylamide, decyl(meth)acrylamide, lauryl(meth)acrylamide, stearyl(meth)acrylamide, cyclohexyl(meth)acrylamide, trityl(meth)acrylamide, 4-t-butylcyclohexylacrylamide, dimethylaminopropyl(meth)acrylamide, 4-acryloylmorpholine, 4-methacryloylmorpholine, [3-(acryloylamino)propyl]trimethylaminium chloride, [3-(methacryloylamino)propyl]trimethylaminium chloride or the like is exemplified. One or more of these compounds may be used.

<Component (B): Polymer Having Repeat Unit Derived From Polymerizable Compound of Formula (I)>

The polymer having a repeat unit derived from a polymerizable compound of formula (I) as the component (2) used in the present invention is a polymer consisting of at least one repeat unit derived from a polymerizable compound of the following formula (I), or a polymer consisting of at least one repeat unit described above, and at least one repeat unit derived from another radically polymerizable compound.

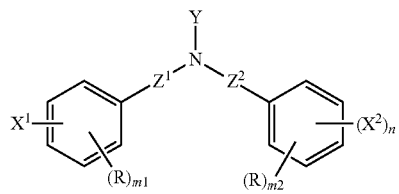

(1)

In short, the polymer as the component (2) used in the present invention specifically encompasses the following polymers:
i) a homopolymer consisting of only one repeat unit derived from a polymerizable compound of formula (I),
ii) a copolymer consisting of two or more repeat units each derived from a polymerizable compound of formula (I),
iii) a copolymer consisting of one repeat unit derived from a polymerizable compound of formula (I), and at least one repeat unit derived from another radically polymerizable compound, and
iv) a copolymer consisting of two or more repeat units each derived from a polymerizable compound of formula (I), and at least one repeat unit derived from another radically polymerizable compound.

Among these polymers, the copolymers ii) to iv) may have a random sequence, an alternate sequence, or a block sequence of the respective repeat units.

The copolymer of the present invention may have a linear or branched molecular chain. As the branched chain, a branched chain having one branch point (star shaped), a branched chain having a plurality of branch points (graft shaped) or the like is exemplified.

The number-average molecular weight of the polymer of the present invention is not limited as long as the resulting composition is applicable onto a base material. For example, a copolymer having a number-average molecular weight within the range of 1,000 to 1,000,000, 5,000 to 500,000, 10,000 to 150,000, 10,000 to 200,000, 20,000 to 100,000 or the like may be exemplified.

The molecular weight distribution (PDI) of the polymer according to the present invention is preferably 1.0 to 5.0, more preferably 1.0 to 4.0, most preferably 1.0 to 3.0, in terms of a weight-average molecular weight/number-average molecular weight (Mw/Mn) ratio.

The weight-average molecular weight and the number-average molecular weight are values obtained by the conversion of data measured by gel permeation chromatography (GPC) using THF as a solvent, based on the molecular weight of polymethyl methacrylate used as a standard.

(Polymerizable Compound of Formula (I))

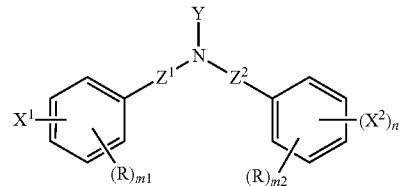

(1)

In the formula,
$X^1$ and $X^2$ each independently represent a C7 to C20 alkyl group or a C7 to C20 alkoxy group.

For $X^1$ and $X^2$, the C7 to C20 alkyl group may be preferably used in a linear or branched form.

As the linear form, a n-heptyl group, a n-octyl group, a n-nonyl group, a n-decyl group, a n-dodecyl group, a n-tridecyl group, a n-tetradecyl group, a n-hexadecyl group, a n-octadecyl group, a n-eicosyl group or the like is exemplified.

As the branched form, a 1,1,2,2-tetramethylpropyl group, a 1,1,3-trimethylbutyl group, a 1-ethylpentyl group, a 1,1,3,3-tetramethylbutyl group, a 2,2,3,3-tetramethylbutyl group, a 1,2,4-trimethylpentyl group, a 2,4,4-trimethylpentyl group, a 2,2,4-trimethylpentyl group, a 1-ethyl-4-methylpentyl group, a 3-ethyl-3-methylpentyl group, a 3-ethyl-4-methylpentyl group, a 1-ethyl methylpentyl group, a 1,1-dimethylhexyl group, a 3,3-dimethylhexyl group, a 4,4-dimethylhexyl group, a 2-ethylhexyl group, a 3-ethylhexyl group, a 6-methylheptyl group, a 1,3,5-trimethylhexyl group, a 1,1,3-trimethylhexyl group, a 1-butyl-1-methylheptyl group, a 1-methylheptyl group, a 1-methyl-1-octylundecyl group or the like is exemplified.

For $X^1$ and $X^2$, the C7 to C20 alkoxy group may be preferably used in a linear or branched form.

As the linear form, a n-heptyloxy group, a n-octyloxy group, a n-nonyloxy group, a n-decyloxy group, a n-dodecyloxy group, a n-tridecyloxy group, a n-tetradecyloxy group, a n-hexadecyloxy group, n-octadecyloxy group, a n-eicosyloxy group or the like is exemplified.

As the branched form, a 1,1,2,2-tetramethylpropyloxy group, a 1,1,3-trimethylbutyloxy group, a 1-ethylpentyloxy group, a 1,1,3,3-tetramethylbutyloxy group, a 2,2,3,3-tetramethylbutyloxy group, a 1,2,4-trimethylpentyloxy group, a 2,4,4-trimethylpentyloxy group, a 2,2,4-trimethylpentyloxy group, a 1-ethyl-4-methylpentyloxy group, a 3-ethyl-3-methylpentyloxy group, a 3-ethyl-4-methylpentyloxy group, a 1-ethyl-1-methylpentyloxy group, a 1,1-dimethylhexyloxy group, a 3,3-dimethylhexyloxy group, a 4,4-dimethylhexyloxy group, a 2-ethylhexyloxy group, a 3-ethylhexyloxy group, a 6-methylheptyloxy group, a 1,3,5-trimethylhexyloxy group, a 1,1,3-trimethylhexyloxy group, a 1-butyl-1-methylheptyloxy group, a 1-methylheptyloxy group, a 1-methyl-1-octylundecyloxy group or the like is exemplified.

In the formula, n represents 0 or 1.

In the formula, $Z^1$ and $Z^2$ each independently represent a single bond or a C1 to C3 alkylene group.

As the C1 to C3 alkylene group for $Z^1$ and $Z^2$, methylene, ethylene, propane-1,3-diyl or the like is exemplified.

In the formula, R represents an organic group or a halogeno group.

The organic group is not particularly limited as long as the organic group is chemically accepted and has the effect of the present invention. As the organic group, a C1 to C6 alkyl group such as a methyl group, an ethyl group, a n-propyl group, an i-propyl group, a n-butyl group, a s-butyl group, an i-butyl group, a t-butyl group, a n-pentyl group, and a n-hexyl group, a C6 to C10 aryl group such as a phenyl group and a naphthyl group, a C1 to C6 alkoxy group such as a methoxy group, an ethoxy group, a n-propoxy group, an i-propoxy group, a n-butoxy group, a s-butoxy group, an i-butoxy group, and a t-butoxy group, a C1 to C6 haloalkyl group such as a chloromethyl group, a chloroethyl group, a trifluoromethyl group, a 1,2-dichloro-n-propyl group, a 1-fluoro-n-butyl group, and a perfluoro-n-pentyl group, or the like is exemplified.

As the halogeno group, a fluoro group, a chloro group, a bromo group, an iodo group or the like is exemplified.

In the formula, m1 and m2 each independently represent any integer of 0 to 4.

In the formula, Y represents a polymerizable functional group. As the polymerizable functional group, a polymerizable group having a carbon-carbon double bond such as a vinyl group, an allyl group, an acryloyl group, a methacryloyl group, a vinyloxycarbonyl group, a prop-1-en-2-yloxycarbonyl group, and an allyloxycarbonyl group, or the like is exemplified.

In the present invention, Y is preferably an acryloyl group or a methacryloyl group.

The compound of formula (I) encompasses a compound of the following formula (II).

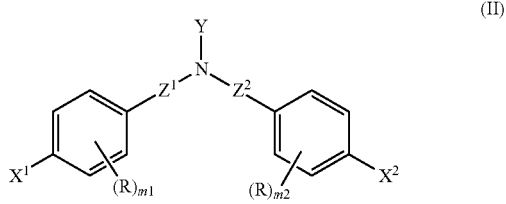

(II)

In the formula, Y, $Z^1$, $Z^2$, $X^1$, $X^2$, R, m1 and m2 are the same as those described in formula (I).

Among the polymerizable compounds of formula (I) or formula (II) used in the present invention, preferably, N,N-bis(4-(1,1,3,3-tetramethylbutyl)phenyl)acrylamide, N,N-bis(4-(1,1,3,3-tetramethylbutyl)phenyl)methacrylamide, N-phenyl-N-(4-(2,4,4-trimethylpentan-2-yl)phenyl)acrylamide, N-phenyl-N-(4-(2,4,4-trimethylpentan-2-yl)phenyl)methacrylamide, N,N-bis(4-octylphenyl)acrylamide, N,N-bis(4-octylphenyl)methacrylamide, N-(4-octylphenyl)-N-phenylacrylamide, and N-(4-octylphenyl)-N-phenylmethacrylamide are exemplified.

(Another Radically Polymerizable Compound)

The "another radically polymerizable compound" is a radically polymerizable compound other than the compound of formula (I) and may be appropriately selected according to intended physical properties such as melting point, viscosity or refractive index. This compound is not particularly limited, but a (meth)acrylic acid, (meth)acrylonitrile, a styrene, a vinyl compound, an olefin compound, unsaturated carboxylic anhydride or the like is exemplified. One or more of these compounds may be used. Specifically, the same compounds as those listed in the radically polymerizable compound as the component (1) are exemplified.

The "another radically polymerizable compound" is particularly preferably a (meth)acrylic acid such as (meth)acrylate or (meth)acrylamide, unsaturated dicarboxylic anhydride, or a styrene, and the (meth)acrylate is preferably unsubstituted or optionally substituted C1 to C18 alkyl (meth)acrylate.

The alkyl (meth)acrylate may have a linear, branched, or cyclic (alicyclic) alkyl site, and a linear or branched alkyl group is preferred. For the linear or branched alkyl (meth)acrylate, the alkyl site is preferably C1 to C12.

As the substituent for the "optionally substituted C1 to C18 alkyl (meth)acrylate", an alicyclic hydrocarbon group, a polar group, an aromatic hydrocarbon group, a heteroaromatic group, a substituted amino groups or the like may be exemplified, though the substituent is not limited thereto.

As the alicyclic hydrocarbon group, an alkyl group such as a methyl group and an ethyl group, an alkenyl group such as a vinyl group and an allyl group, and an alkynyl group such as an ethynyl group are exemplified.

As the polar group, a hydroxy group, an amino group, a tetrahydrofurfuryl group or the like is exemplified.

The aromatic hydrocarbon group is an aromatic hydrocarbon group containing one or more rings. A phenyl group, a naphthyl group or the like is exemplified.

The heteroaromatic group is an aromatic group having one or more heteroatoms selected from O, S, and N. A pyridinyl group, a thienyl group, a furyl group, a benzimidazolyl group or the like is exemplified.

As the substituted amino group, a methylamino group, an ethylamino group, a phenylamino group, a dimethylamino group, a methylethylamino group or the like is exemplified.

As the "unsubstituted or optionally substituted C1 to C18 alkyl (meth)acrylate", specifically, methyl (meth)acrylate, ethyl (meth)acrylate, hydroxyethyl (meth)acrylate, n-propyl (meth)acrylate, isopropyl (meth)acrylate, n-butyl (meth)acrylate, i-butyl (meth)acrylate, n-hexyl (meth)acrylate, 2-ethylhexyl (meth)acrylate, decyl (meth)acrylate, lauryl (meth)acrylate, stearyl (meth)acrylate, cyclohexyl (meth)acrylate, trityl (meth)acrylate, 4-t-butylcyclohexyl (meth)acrylate, tetrahydrofurfuryl (meth)acrylate, dimethylaminopropyl (meth)acrylate, (2-acryloyloxyethyl) trimethylaminium chloride, (2-methacryloyloxyethyl) trimethylaminium chloride, (2-acryloyloxyethyl)

dimethylbenzylaminium chloride, (2-methacryloyloxyethyl) dimethylbenzylaminium chloride or the like is exemplified.

As the (meth)acrylamide, methyl(meth)acrylamide, dimethyl(meth)acrylamide, ethyl(meth)acrylamide, hydroxyethyl(meth)acrylamide, diethyl(meth)acrylamide, n-propyl (meth)acrylamide, dipropyl(meth)acrylamide, diisopropyl (meth)acrylamide, isopropylacrylamide, n-butyl(meth) acrylamide or the like is exemplified.

As the unsaturated dicarboxylic anhydride, maleic anhydride, citraconic anhydride, itaconic anhydride or the like is exemplified.

As the styrene, styrene, p-hydroxystyrene, p-chlorostyrene, p-bromostyrene, p-methylstyrene, p-methoxystyrene, p-t-butoxystyrene, p-t-butoxycarbonylstyrene or the like is exemplified.

(Compositional Ratio of Repeat Unit)

In the polymer used in the present invention, the contents of the repeat unit derived from a polymerizable compound of formula (I), and the repeat unit derived from another radically polymerizable compound are not particularly limited. The molar ratio between the repeat unit derived from a polymerizable compound of formula (I), and the repeat unit derived from another radically polymerizable compound may be selected from ranges such as 100:0 to 50:50, 99.5:0.5 to 60:40, 99:1 to 70:30, 98:2 to 75:25, and 95:5 to 80:20.

(Mixing Ratio Between Components (A) and (B))

The mixing ratio between the component (A) and the component (B) is not particularly limited, but is preferably 0.1 to 80 parts by mass, more preferably 1 to 50 parts by mass, most preferably 1 to 30 parts by mass, with respect to 100 parts by mass of the component (A).

(Methods for Producing Compounds of Formula (I) and Formula (II))

The compounds of formula (I) and formula (II), each of which is the polymerizable compound used in the present invention, may be synthesized by methods of Examples or other known methods.

For example, a compound of formula (I) wherein Y is an acryloyl group or a methacryloyl group may by produced by the following method.

Secondary amine of formula (I'):

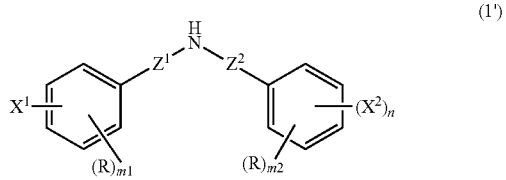

(wherein $X^1$, $X^2$, n, $Z^1$, $Z^2$, R, m1, and m2 are as defined in formula (I))

is reacted with (meth)acrylic acid halide such as (meth) acrylic acid chloride in the presence of a base in a solvent.

As the solvent, an amide solvent such as N,N-dimethylformamide (DMF) and N,N-dimethylacetamide, an ether solvent such as tetrahydrofuran (THF), 1,2-dimethoxyethane, diethyl ether, and methyl cellosolve, aromatic hydrocarbon such as benzene, toluene, xylene, chlorobenzene, dichlorobenzene, and benzonitrile, saturated hydrocarbon such as pentane, hexane, octane, and cyclohexane, halogenated hydrocarbon such as dichloromethane, chloroform, carbon tetrachloride, and 1,2-dichloroethane, or the like is exemplified. One of these solvents or a mixed solvent of two or more thereof may be used.

As the base, an organic base including alicyclic amine such as triethylamine and tributylamine, aromatic amine such as pyridine, N-ethylpyridine, N,N-dimethylaniline, and N,N-dimethylaminopyridine, and metal alkoxide such as sodium ethylate and sodium methylate, or an inorganic base including hydroxide of an alkali metal or an alkaline earth metal such as lithium hydroxide, sodium hydroxide, potassium hydroxide, lithium carbonate, sodium carbonate, potassium carbonate, calcium hydroxide, magnesium hydroxide, calcium carbonate, magnesium carbonate, and sodium bicarbonate, and carbonate of an alkali metal or an alkaline earth metal may be used.

The reaction temperature is −50° C. to 200° C.

(Polymerization Method for Polymer)

Any polymer may be used in the present invention without particular limitations as long as the polymer is obtained by the polymerization of at least one polymerizable compound of formula (I) or formula (II) or the polymerization of the compound with another polymerizable compound. The polymerization reaction is not particularly limited and may be performed by a known method for synthesizing polyacrylate or the like. Radical polymerization, anionic polymerization, cationic polymerization, ring-opening polymerization, coordination polymerization or the like may be exemplified. One example thereof will be shown in Examples.

For example, in the case of radically polymerizing a compound of formula (I) or (II) wherein Y is an acryloyl group or a methacryloyl group with (meth)acrylate, the polymerizable compound of formula (I) or formula (II) and the (meth)acrylate are subjected to polymerization reaction by heating or light irradiation in the presence of a radical polymerization initiator in a solvent.

The polymerization solvent is not particularly limited as long as the solvent is not involved in the polymerization reaction and is compatible with a polymer. Specifically, a nonpolar solvent or a low polar solvent including an ether compound such as diethyl ether, tetrahydrofuran (THF), dioxane, and trioxane, an ester compound such as ethyl acetate, a ketone compound such as methyl ethyl ketone and cyclohexanone, and an alicyclic, aromatic or alicyclic hydrocarbon compound such as hexane and toluene may be exemplified. These solvents may be used alone or used as a mixed solvent of two or more thereof.

As the radical polymerization initiator, azobisisobutyronitrile, azobis-2,4-dimethylvaleronitrile, azobiscyclohexanecarbonitrile, azobis-2-amidinopropane hydrochloride, potassium peroxodisulfate, ammonium peroxodisulfate, t-butyl hydroperoxide, di-t-butyl cumene hydroperoxide peroxide, acetyl peroxide, benzoyl peroxide, lauroyl peroxide or the like is exemplified.

<Component (C): Polymerization Initiator>

The polymerization initiator is preferably a thermal radical polymerization initiator. The thermal radical polymerization initiator is preferably organic peroxide. As the organic peroxide, cumene hydroperoxide, para-menthane hydroperoxide, tertiary butyl hydroperoxide, diisopropylbenzene dihydroperoxide, methyl ethyl ketone peroxide, benzoyl peroxide, tertiary butyl peroxybenzoate or the like is exemplified. Among them, cumene hydroperoxide is preferred from the viewpoint of stability.

The amount of the polymerization initiator used is preferably 0.1 to 20 parts by mass, more preferably 0.5 to 10 parts by mass, most preferably 0.8 to 5 parts by mass, with respect to 100 parts by mass of the component (A). When the amount is 0.1 parts by mass or more, a curing rate is accelerated. When the amount is 20 parts by mass or less, storage stability is improved.

<Component (D): Reducing Agent>

Any reducing agent may be used as long as the reducing agent reacts with the polymerization initiator to generate a radical.

As the reducing agent, tertiary amine, a thiourea derivative, a transition metal salt or the like is exemplified. As the tertiary amine, triethylamine, tripropylamine, tributylamine, N,N-dimethyl-para-toluidine or the like is exemplified. As the thiourea derivative, 2-mercaptobenzimidazole, methylthiourea, dibutylthiourea, tetramethylthiourea, ethylenethiourea or the like is exemplified. As the transition metal salt, cobalt octylate, cobalt naphthenate, copper naphthenate, vanadyl acetylacetonate or the like is exemplified. Among them, a transition metal salt is preferred from the viewpoint of reactivity. The transition metal salt is preferably vanadyl acetylacetonate.

The amount of the reducing agent used is preferably 0.05 to 15 parts by mass, more preferably 0.1 to 5 parts by mass, with respect to 100 parts by mass of the component (A). When the amount is 0.05 parts by mass or more, a curing rate is accelerated. When the amount is 15 parts by mass or less, storage stability is improved.

<Optional Component>

An additive such as an adhesive aid (e.g., a silane coupling agent), a thickener, an elastomer, a core-shell polymer, a reactive diluent, a nonreactive diluent or solvent, a vinyl aromatic compound, a paraffin, a nonreactive colorant, a filler, an antioxidant, a light stabilizer, phosphate, a plasticizer, a tackiness-imparting agent (e.g., a tackifier), a preservation stabilizer (e.g., BHT), a dye, a pigment, a flame retardant, a sensitizer, a heavy metal inactivator, an ion trapping agent, an emulsifier, a water dispersion stabilizer, an antifoaming agent, a mold release agent, a leveling agent, a rheology controlling agent, or a surfactant may be mixed in an appropriate amount into the adhesive composition of the present invention as long as the object of the present invention is not deteriorated.

As the silane coupling agent, for example, a glycidyl group-containing silane coupling agent such as 3-glycidoxypropylmethyldimethoxysilane, 3-glycidoxypropylmethyldiethoxysilane, 3-glycidoxypropylmethyldipropyloxysilane, 3-glycidoxypropyldimethylmonomethoxysilane, 3-glycidoxypropyldimethylmonoethoxysilane, 3-glycidoxypropyldimethylmonopropyloxysilane, 2-(3,4-epoxycyclohexyl)ethyltrimethoxysilane, 3-glycidoxypropyltriethoxysilane, 3-glycidoxypropyltrimethoxysilane, and 3-glycidoxypropylmethyldiethoxysilane, a vinyl group-containing silane coupling agent such as vinyltris(β-methoxyethoxy)silane, vinyltriethoxysilane, and vinyltrimethoxysilane, a (meth)acryloyl group-containing silane coupling agent such as 3-methacryloxypropylmethyldimethoxysilane, 3-methacryloxypropylmethyldiethoxysilane, 3-methacryloxypropyldimethylmonomethoxysilane, 3-methacryloxypropyldimethylmonoethoxysilane, 3-acryloxypropylmethyldipropyloxysilane, 3-acryloxypropylmethyldimethoxysilane, 3-acryloxypropylmethyldiethoxysilane, 3-acryloxypropylmethyldipropyloxysilane, 3-acryloxypropyldimethylmonopropyloxysilane, 3-acryloxypropyldimethylmonomethoxysilane, 3-acryloxypropyldimethylmonoethoxysilane, 3-acryloxypropyldimethylmonopropyloxysilane, and γ-methacryloxypropyltrimethoxysilane, an amino group-containing silane coupling agent such as N-β-(aminoethyl)-γ-aminopropyltrimethoxysilane, γ-aminopropyltriethoxysilane, and N-phenyl-γ-aminopropyltrimethoxysilane, and others such as γ-mercaptopropyltrimethoxysilane and γ-chloropropyltrimethoxysilane are exemplified. These silane coupling agents may be used alone or used by combination of two or more thereof.

The thickener is effectively polybutyl methacrylate or the like having a molecular weight of approximately 10,000 to approximately 40,000. Use of the thickener may increase the viscosity of an adhesive agent so as to attain the consistency of a viscous syrup having better applicability. Such a thickener may generally be used in an amount of approximately 50% by mass or less with respect to the total mass of an adhesive agent.

In the present adhesive composition, an elastomer may be used. The elastomer material may improve the fracture toughness of a cured product of an adhesive agent. This may be beneficial, for example, for the adhesion of a rigid high-yield strength material (e.g., a metal base material that does not mechanically absorb energy as easily as a material such as a flexible polymer base material). Such an additive may generally be used in an amount of approximately 50% by mass or less with respect to the total mass of an adhesive agent.

The elastomer for use in the present adhesive composition is preferably a polymer substance having rubber elasticity at ordinary temperature, and may be preferably dissolved or dispersed in a polymerizable vinyl monomer.

As such an elastomer, a butadiene (co)polymer such as polybutadiene, a (meth)acrylonitrile-butadiene-(meth)acrylic acid copolymer, a (meth)acrylonitrile-butadiene-methyl (meth)acrylate copolymer, a methyl (meth)acrylate-butadiene-styrene copolymer (MBS), a (meth)acrylonitrile-butadiene rubber (NBR), and styrene-butadiene, various synthetic rubbers such as linear polyurethane, natural rubber, various thermoplastic elastomers or the like is exemplified. One or more of these elastomers may be used as long as there is no problem with compatibility.

The applicability and flow characteristics of an adhesive agent may be improved using a core-shell polymer. The improved applicability and flow characteristics may be confirmed from reduction in undesired string which remains when an adhesive agent is distributed from a syringe-type applicator or sag after application of an adhesive agent to a vertical plane. The core-shell polymer may generally be added in an amount of approximately 5% by mass or more, approximately 10% by mass or more, or approximately 20% by mass or more, and approximately 50% by mass or less, approximately 40% by mass or less, or approximately 30% by mass or less with respect to the total mass of an adhesive agent.

A reactive diluent may be added. As a suitable reactive diluent, a 1,4-dioxo-2-butene functional compound and an aziridine compound are exemplified.

The usable time of an adhesive agent may be prolonged by the addition of a vinyl aromatic compound, without substantially influencing a polymerization rate, a curing time and the desired characteristics of a cured product of an adhesive agent.

As a useful vinyl aromatic compound, for example, an α-methylstyrene group-containing oligomer prepared through the reaction of 3-isopropenyl-α,α-dimethylbenzyl isocyanate with a monofunctional or polyfunctional reactive hydrogen compound, preferably monofunctional or polyfunctional amine, alcohol, or a combination thereof is exemplified. As particularly preferred monofunctional or polyfunctional amine, amine-terminated polyether commercially available under the trade name JEFFAMINE from Huntsman PetroChemical Corp. (Houston, Texas, USA), for example, JEFFAMINE ED600 (diamine-terminated polyether having a nominal molecular weight of 600), JEFFAMINE D400 (diamine-terminated polyether having a nominal molecular weight of 400), JEFFAMINE D2000 (diamine-terminated polyether having a nominal molecular weight of 2000), JEFFAMINE T3000 (triamine-terminated polyether having a nominal molecular weight of 3000), and JEFFAMINE M2005 (monoamine-terminated polyether having a nominal molecular weight of 2000) are exemplified. As a suitable alcohol-containing compound, for example, polypropylene glycol, polycaprolactone triol, and diethylene glycol are exemplified. The vinyl aromatic compound may generally be added in an amount of approximately 1% by mass or more, approximately 2% by mass or more, or approximately 5% by mass or more, and approximately 30% by mass or less, approximately 20% by mass or less, or approximately 10% by mass or less with respect to the total mass of an adhesive agent.

As other additives, a nonreactive diluent or solvent (e.g., acetone, methyl ethyl ketone, ethyl acetate, and N-methylcaprolactam), a nonreactive colorant, a filler (e.g., carbon black, polyethylene, hollow glass/ceramic beads, silica, titanium dioxide, a solid glass/ceramic microsphere, a silica-alumina ceramic microsphere, a conductive and/or heat conductive particle, an antistatic compound, and chalk) or the like is exemplified. Various optional additives may be added in amounts that do not essentially reduce the polymerization rate of a monomer or the desired characteristics of a cured product of an adhesive agent.

In the adhesive composition of the present invention, various paraffins may be used for rapid curing of a portion in contact with air. As the paraffins, paraffin, microcrystalline wax, carnauba wax, beeswax, lanoline, spermaceti, ceresin, candelilla wax or the like is exemplified. Among them, paraffin is preferred. The melting points of the paraffins are preferably 40 to 100° C.

The amount of the paraffins used is preferably 0.1 to 5 parts by mass with respect to 100 parts by mass of a polymerizable vinyl monomer (1). When the amount is 0.1 parts by mass or more, the curing of a portion in contact with air is improved. When the amount is 5 parts by mass or less, adhesive strength is not reduced.

Various antioxidants or the like including a polymerization inhibitor may be further used for the purpose of improving storage stability. As the antioxidant, hydroquinone, hydroquinone monomethyl ether, 2,6-di-tertiary butyl-p-cresol, 2,2'-methylenebis(4-methyl-6-tertiary butylphenol), triphenyl phosphite, phenothiazine, N-isopropyl-N'-phenyl-p-phenylenediamine or the like is exemplified.

The amount of the antioxidant used is preferably 0.001 to 3 parts by mass, more preferably 0.01 to 1 parts by mass, with respect to 100 parts by mass of a polymerizable vinyl monomer (1). The amount of 0.001 parts by mass or more is effective. When the amount is 3 parts by mass or less, adhesion properties are improved.

Among the optional components described above, an antioxidant and a light stabilizer are preferably added for improving the weather resistance of an adhesive composition. As the antioxidant and the light stabilizer, commercially available products may be used. SUMILIZER® BHT, SUMILIZER® S, SUMILIZER® BP-76, SUMILIZER® MDP-S, SUMILIZER® GM, SUMILIZER® BBM-S, SUMILIZER® WX-R, SUMILIZER® NW, SUMILIZER® BP-179, SUMILIZER® BP-101, SUMILIZER® GA-80, SUMILIZER® TNP, SUMILIZER® TPP-R, and SUMILIZER® P-16 (manufactured by Sumitomo Chemical Co., Ltd.), ADEKASTAB® AO-20, ADEKASTAB® AO-30, ADEKASTAB® AO-40, ADEKASTAB® AO-50, ADEKASTAB® AO-60, ADEKASTAB® AO-70, ADEKASTAB® AO-80, ADEKASTAB® AO-330, ADEKASTAB® PEP-4C, ADEKASTAB® PEP-8, ADEKASTAB® PEP-24G, ADEKASTAB® PEP-36, ADEKASTAB® HP-10, ADEKASTAB® 2112, ADEKASTAB® 260, ADEKASTAB® 522A, ADEKASTAB® 329K, ADEKASTAB® 1500, ADEKASTAB® C, ADEKASTAB® 135A, and ADEKASTAB® 3010 (manufactured by ADEKA Corp.), TINUVIN® 770, TINUVIN® 765, TINUVIN® 144, TINUVIN® 622, TINUVIN® 111, TINUVIN® 123, and TINUVIN® 292 (manufactured by Ciba Specialty Chemicals (BASF SE)) or the like is exemplified. The amount of such an antioxidant and a light stabilizer mixed is not particularly limited, but is preferably 0.001 to 10 parts by mass, more preferably 0.01 to 5 parts by mass, with respect to 100 parts by mass of the component (B).

In the present embodiment, phosphate is preferably further used for improving adhesion properties and accelerating a curing rate.

As the phosphate, acid phosphoxy ethyl (meth)acrylate, acid phosphoxy propyl (meth)acrylate, bis(2-(meth)acryloyloxyethyl) phosphate or the like is exemplified from the viewpoint of adhesion properties and a curing rate. Among them, acid phosphoxy ethyl (meth)acrylate is preferred from the viewpoint of adhesion properties and a curing rate.

The amount of the phosphate used is preferably 0.05 to 10 parts by mass, more preferably 0.1 to 7 parts by mass, with respect to 100 parts by mass of a polymerizable vinyl monomer (1). When the amount is 0.05 parts by mass or more, a curing rate is accelerated. Particularly, adhesion properties to aluminum are improved. When the amount is 10 parts by mass or less, adhesion properties are improved.

<Usage Pattern of Adhesive Composition>

The adhesive composition of the present invention is particularly useful for the adhesion of a low-surface energy plastic or polymer base material, which is a difficult-to-bond material, without the use of a complicated surface treatment technique such as flame treatment, ITRO treatment, corona discharge, or primer treatment. As the "low-surface energy plastic" according to the present disclosure, an olefin material such as polyethylene (PE), polypropylene (PP), cycloolefin polymer (COP), and cycloolefin copolymer (COC), polyacetal (POM), nylon 6 (PA6), polyethylene terephthalate (PET), polybutylene terephthalate (PBT), polydimethylsilicone (PDMS), polyether ether ketone (PEEK), modified polyphenylene ether (PPE), polyphenylene sulfide (PPS), polymethylpentene (PMP), liquid crystal polyester (LCP), acrylonitrile-butadiene-styrene (ABS), a fluorinated polymer such as polytetrafluoroethylene (PTFE), and elastomer-modified forms of these materials, and polymer blends of these materials and elastomers such as ethylene-propylene rubber (EPM) or ethylene-propylene-diene rubber (EPDM) are exemplified. As the "high-surface energy plastic" according to the present disclosure, polyvinyl chloride (PVC), polycarbonate (PC), and polymethyl methacrylate (PMMA) are exemplified. The two-component adhesive agent of the present disclosure may be advantageously used for a base material containing an elastomer-modified form or a polymer blend of an elastomer which tends to adsorb oxygen. As a suitable base material containing an elastomer-modified form or a polymer blend of an elastomer, an olefin elastomer base material containing an elastomer-modified form of polyolefin such as polyethylene or polypropylene, or a polymer blend of an elastomer such as ethylene-propylene rubber (EPM) or ethylene-propylene-diene rubber (EPDM) and polyethylene, polypropylene or the like, particularly, a polypropylene elastomer base material containing an elastomer-modified form of polypropylene or a polymer blend of an elastomer such as ethylene-propylene rubber (EPM) or ethylene-propylene-diene rubber (EPDM) and polypropylene is exemplified. The present invention is not limited thereby, and the composition may be used for the adhesion of any thermoplastic resin, wood, ceramic, concrete, undercoated metal, and fiber-reinforced plastic.

The adhesive composition of the present invention is preferably used as a two-component adhesive composition. For the two-component type, all the essential components of the adhesive composition of the present embodiment are not mixed during storage, and the adhesive composition is separated into a first agent and a second agent so that at least the polymerization initiator (component (C)) and at least the reducing agent (component (D)) are stored in the first agent and the second agent, respectively.

Specifically, the first agent may be prepared as a composition containing the components (A), (B) and (C), and the second agent may be prepared as a composition containing the components (A), (B) and (D). Alternatively, the first agent may be prepared as a composition containing the components (A) and (C), and the second agent may be prepared as a composition containing the components (B) and (D); or the first agent may be prepared as a composition containing the components (A), (B) and (C), and the second agent may consist of the component (D), for example. Each agent may be supplemented, if necessary, with an optional component.

The two-component type is preferred because of excellent storage stability. In this case, both the agents may be contacted with each other by simultaneous or separate application, and cured, and thereby used as the two-component adhesive composition.

The adhesive composition of the present invention does not require accurate gauging of two agents and is cured at ordinary temperature even by incomplete gauging or mixing or sometimes, mere contact between the two agents. The adhesive composition of the present invention does not require ultraviolet ray for its curing. The adhesive composition of the present invention is excellent in workability.

<Shaped Body>

The shaped body of the present invention is obtained by applying the adhesive composition described above onto a plastic base material, and curing the adhesive composition so that the resulting layer is directly disposed on the base material or between base materials.

EXAMPLES

The number-average molecular weights of polymers obtained in Examples were measured using the following apparatus and conditions.

[Apparatus]
 Sample injection apparatus: Waters 2695 Alliance
 Separation column: Shodex KF-G, 805L, 804L, and 804L
 Detector: Waters 2414 differential refractive index (RI) detector and 2998 photodiode array (PDA) detector
 Column oven: Column oven manufactured by Waters Corp.
[Conditions]
 Column oven temperature: 40° C.
 RI detector temperature: 40° C.
 Mobile phase: Tetrahydrofuran
 Flow rate: 1.0 mL/min
 Standard injection volume: 200 μL
 PDA detector extraction wave: 254.0 nm
 Quantitative calculation: Based on standard polymethyl methacrylate (Synthesis Example 1) Synthesis of N,N-bis(4-(1,1,3,3-tetramethylbutyl)phenyl) acrylamide (DOPAA)

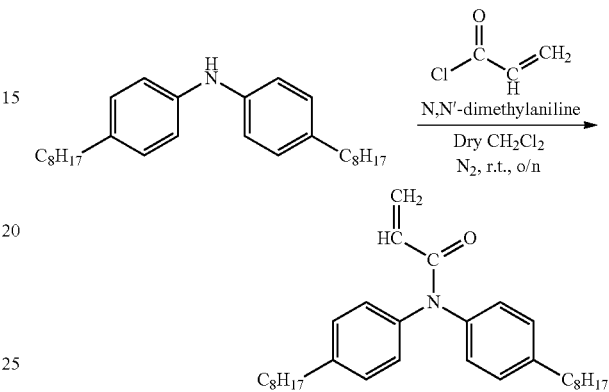

To a 1 L four-neck flask purged with nitrogen, bis[4-(1,1,3,3-tetramethylbutyl)phenyl]amine (50.00 g, 0.127 mol), N,N-dimethylaniline (46.17 g, 0.381 mol), and 477 mL of super dehydrated dichloromethane were added, and stirred until uniformly dissolved. Subsequently, the reaction solution was cooled to 0° C. or lower in an ice/ethanol bath, and acrylic acid chloride (22.99 g, 0.254 mol) was slowly added dropwise thereto, followed by stirring for 30 minutes. Then, the reaction solution was warmed to room temperature and reacted for 24 hours. After the completion of reaction, the solvent was distilled off with an evaporator, and the crude product was dissolved in 250 mL of ethyl acetate. Then, the solution was washed with a 1 N aqueous hydrochloric acid solution, a saturated aqueous solution of sodium bicarbonate, and saline. The organic layer was dehydrated over magnesium sulfate, and the filtrate was then distilled off with an evaporator. The obtained crude product was recrystallized and purified with hexane to obtain N,N-bis(4-(1,1,3,3-tetramethylbutyl)phenyl)acrylamide (38.67 g, percent yield: 68%). Results of mass spectrometry will be shown below. High Resolution ESI-TOF-MS m/z Calcd. for $[C_{31}H_{45}NO\ ([M+Na]^+)]$: 470.3393 found 470.3317.

(Synthesis Example 2) Production of Adhesive Polymer 1 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.20 g of AIBN (a product of Tokyo Chemical Industry Co., Ltd.) were added, and dissolved in 45 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=28.19 g, Mn=17,379, Mw/Mn=2.08

(Synthesis Example 3) Production of Adhesive Polymer 2 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.20 g of AIBN (a product of Tokyo Chemical Industry Co., Ltd.) were added, and dissolved in 40.62 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=27.82 g, Mn=26,399, Mw/Mn=2.20

(Synthesis Example 4) Production of Adhesive Polymer 3 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.20 g of AIBN (a product of Tokyo Chemical Industry Co., Ltd.) were added, and dissolved in 36.69 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=29.01 g, Mn=29,109, Mw/Mn=2.10

(Synthesis Example 5) Production of Adhesive Polymer 4 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.20 g of AIBN (a product of Tokyo Chemical Industry Co., Ltd.) were added, and dissolved in 33.18 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=28.87 g, Mn=31,641, Mw/Mn=2.20

(Synthesis Example 6) Production of Adhesive Polymer 5 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.20 g of AIBN (a product of Tokyo Chemical Industry Co., Ltd.) were added, and dissolved in 30.02 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=27.31 g, Mn=34,687, Mw/Mn=2.38

(Synthesis Example 7) Production of Adhesive Polymer 6 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.20 g of AIBN (a product of Tokyo Chemical Industry Co., Ltd.) were added, and dissolved in 20.02 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=28.11 g, Mn=36,941, Mw/Mn=2.94

(Synthesis Example 8) Production of Adhesive Polymer 7 (DOPAA/EA=85/15)

To a 300 mL four-neck flask, 25.52 g of DOPAA, 4.50 g of ethyl acrylate (EA: a product of Tokyo Chemical Industry Co., Ltd.), and 0.20 g of AIBN (a product of Tokyo Chemical Industry Co., Ltd.) were added, and dissolved in 45.03 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=29.33 g, Mn=21,484, Mw/Mn=2.11

(Synthesis Example 9) Production of Adhesive Polymer 8 (DOPAA/EA=80/20)

To a 300 mL four-neck flask, 24.02 g of DOPAA, 6.00 g of ethyl acrylate (EA: a product of Tokyo Chemical Industry Co., Ltd.), and 0.20 g of AIBN (a product of Tokyo Chemical Industry Co., Ltd.) were added, and dissolved in 45.03 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=28.13 g, Mn=24,577, Mw/Mn=1.98

(Synthesis Example 10) Production of Adhesive Polymer 9 (DOPAA/EA=70/30)

To a 300 mL four-neck flask, 21.01 g of DOPAA, 9.00 g of ethyl acrylate (EA: a product of Tokyo Chemical Industry Co., Ltd.), and 0.20 g of AIBN (a product of Tokyo Chemical Industry Co., Ltd.) were added, and dissolved in 45.03 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=28.83 g, Mn=19,320, Mw/Mn=2.18

(Synthesis Example 11) Production of Adhesive Polymer 10 (DOPAA/MA=90/10)

To a 300 mL four-neck flask, 18.10 g of DOPAA, 2.00 g of methyl acrylate (MA: a product of Tokyo Chemical Industry Co., Ltd.), and 0.14 g of AIBN (a product of Tokyo Chemical Industry Co., Ltd.) were added, and dissolved in 30 g of toluene. Deaeration was performed by the application of pressure reduction operation, and the mixture was heated and stirred at 65° C. for 6 hours in a nitrogen atmosphere. Then, 0.07 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=16.23 g, Mn=13,360, Mw/Mn=1.84

(Synthesis Example 12) Production of Adhesive Polymer 11 (DOPAA/nBA=90/10)

To a 300 mL four-neck flask, 18.09 g of DOPAA, 2.10 g of n-butyl acrylate (nBA: a product of Tokyo Chemical Industry Co., Ltd.), and 0.18 g of AIBN (a product of Tokyo Chemical Industry Co., Ltd.) were added, and dissolved in 30 g of toluene. Deaeration was performed by the application of pressure reduction operation, and the mixture was heated and stirred at 65° C. for 6 hours in a nitrogen atmosphere. Then, 0.09 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=17.93 g, Mn=15,615, Mw/Mn=1.71

(Synthesis Example 13) Production of Adhesive Polymer 12 (DOPAA/iBA=90/10)

To a 300 mL four-neck flask, 18.09 g of DOPAA, 2.10 g of i-butyl acrylate (iBA: a product of Tokyo Chemical Industry Co., Ltd.), and 0.18 g of AIBN (a product of Tokyo Chemical Industry Co., Ltd.) were added, and dissolved in 30 g of toluene. Deaeration was performed by the application of pressure reduction operation, and the mixture was heated and stirred at 65° C. for 6 hours in a nitrogen atmosphere. Then, 0.09 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=18.03 g, Mn=16,271, Mw/Mn=1.88

(Synthesis Example 14) Production of Adhesive Polymer 13 (DOPAA/THFA=90/10)

To a 300 mL four-neck flask, 26.97 g of N,N-bis(4-(1,1,3,3-tetramethylbutyl)phenyl)acrylamide (DOPAA), 2.99 g of tetrahydrofurfuryl acrylate (THFA: a product of Tokyo Chemical Industry Co., Ltd.), and 0.20 g of AIBN (a product of Tokyo Chemical Industry Co., Ltd.) were added, and dissolved in 45 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=27.23 g, Mn=13,901, Mw/Mn=2.21

(Synthesis Example 15) Production of Adhesive Polymer 14 (DOPAA/HEA=90/10)

To a 300 mL four-neck flask, 27.10 g of DOPAA, 3.03 g of 2-hydroxyethyl acrylate (HEA: a product of Tokyo Chemical Industry Co., Ltd.), and 0.20 g of AIBN (a product of Tokyo Chemical Industry Co., Ltd.) were added, and dissolved in 45 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=27.15 g, Mn=22,703, Mw/Mn=2.29

(Synthesis Example 16) Production of Adhesive Polymer 15 (DOPAA/EHA=90/10)

To a 300 mL four-neck flask, 27.03 g of DOPAA, 3.02 g of 2-ethylhexyl acrylate (EHA: a product of Tokyo Chemical Industry Co., Ltd.), and 0.20 g of AIBN (a product of Tokyo Chemical Industry Co., Ltd.) were added, and dissolved in 45 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=26.90 g, Mn=12,588, Mw/Mn=1.80

(Synthesis Example 17) Production of Adhesive Polymer 16 (DOPAA/styrene=90/10)

To a 300 mL four-neck flask, 30.00 g of DOPAA, 3.33 g of styrene (a product of Tokyo Chemical Industry Co., Ltd.), and 0.20 g of AIBN (a product of Tokyo Chemical Industry Co., Ltd.) were added, and dissolved in 50 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=31.60 g, Mn=22,408, Mw/Mn=2.36

(Synthesis Example 18) Production of Adhesive Polymer 17 (DOPAA/DEAA=90/10)

To a 300 mL four-neck flask, 30.00 g of DOPAA, 3.33 g of N,N-diethylacrylamide (DEAA: a product of Tokyo Chemical Industry Co., Ltd.), and 0.19 g of AIBN (a product of Tokyo Chemical Industry Co., Ltd.) were added, and dissolved in 50 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=30.00 g, Mn=25,377, Mw/Mn=2.08

(Synthesis Example 19) Production of Adhesive Polymer 18 (DOPAA/Maleic Anhydride=90/10)

To a 300 mL four-neck flask, 20.00 g of DOPAA, 2.22 g of maleic anhydride (a product of Tokyo Chemical Industry Co., Ltd.), and 0.14 g of AIBN (a product of Tokyo Chemical Industry Co., Ltd.) were added, and dissolved in 22.2 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=20.07 g, Mn=28,576, Mw/Mn=1.78

(Synthesis Example 20) Production of Adhesive Polymer 19 (DOPAA/iBMA=90/10)

To a 300 mL four-neck flask, 20.00 g of DOPAA, 2.22 g of isobutyl methacrylate (iBMA: a product of Tokyo Chemical Industry Co., Ltd.), and 0.13 g of AIBN (a product of Tokyo Chemical Industry Co., Ltd.) were added, and dissolved in 22.2 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=21.11 g, Mn=26,758, Mw/Mn=2.33

(Synthesis Example 21) Production of Adhesive Polymer 20 (DOPAA/EHMA=90/10)

To a 300 mL four-neck flask, 20.00 g of DOPAA, 2.22 g of 2-ethylhexyl methacrylate (EHMA: a product of Tokyo Chemical Industry Co., Ltd.), and 0.12 g of AIBN (a product of Tokyo Chemical Industry Co., Ltd.) were added, and dissolved in 22.2 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=21.38 g, Mn=35,929, Mw/Mn=1.90

(Synthesis Example 22) Production of Adhesive Polymer 21 (poly{N,N-bis(4-(1,1,3,3-tetramethyl-butyl)phenyl)acrylamide} (PDOPAA))

To a 500 mL four-neck flask, 100.0 g of DOPAA, 150.0 g of toluene, and 0.322 g of AIBN were added, and warmed to 30° C. in a nitrogen atmosphere. After confirmation that the inside of the system was homogeneous, deaeration under reduced pressure was performed three times with a diaphragm pump while the mixture was stirred with a magnetic stirrer. The mixture thus deaerated was warmed to 65° C. and stirred for 24 hours. Then, the flask was brought back to room temperature, and reprecipitation was performed using 1600 mL of methanol. A white powder was obtained by vacuum drying at 120° C. for 2 hours. Yield=96.00 g, Mn=14,315, Mw/Mn=1.89

(Preparation of Adhesive Composition)

The respective components in the amounts shown in Tables 1 to 11 were stirred and mixed to obtain adhesive compositions. The composition obtained using cumene hydroperoxide (2) was used as the first agent, and the composition obtained using vanadyl acetylacetonate (3) was used as the second agent. Equal amounts of the first agent and the second agent were stirred and mixed to obtain an adhesive composition.

In Tables 1 to 11, the amount of each substance mixed is indicated by parts by mass. The details of each mixed substance are as described below.

EHMA: 2-Ethylhexyl methacrylate, a commercially available product
MMA: Methyl methacrylate, a commercially available product
EMA: Ethyl methacrylate, a commercially available product
nBMA: n-Butyl methacrylate, a commercially available product
iBMA: i-Butyl methacrylate, a commercially available product
CHMA: Cyclohexyl methacrylate, a commercially available product
IBOMA: Isobornyl methacrylate, a commercially available product
LMA: Lauryl methacrylate, a commercially available product
BzMA: Benzyl methacrylate, a commercially available product
THFMA: Tetrahydrofurfuryl methacrylate, a commercially available product
Cumene hydroperoxide: a commercially available product
Vanadyl acetylacetonate: a commercially available product
Cobalt octylate: a commercially available product
Cobalt naphthenate: a commercially available product
Ethylenethiourea: a commercially available product
NBR: Acrylonitrile-butadiene rubber, a commercially available product
SBR: Styrene-butadiene rubber, a commercially available product
Bis-GMA: 2,2-Bis[4(-hydroxy-3-methacryloyloxy-propoxy)phenyl]propane, a commercially available product
TE-2000: Nippon Soda Co., Ltd., terminally urethane methacrylate-modified polybutadiene
TEAI-1000: Nippon Soda Co., Ltd., terminally urethane acrylate-modified polybutadiene Tensile Shear Strength (Tensile Shear Adhesive Strength)

The following test pieces were used.
Examples 1 to 40 and Comparative Examples 1 to 4: Polypropylene (PP)
Example 41: High-density polyethylene (HDPE)
Example 42: Low-density polyethylene (LDPE)
Example 43: Cycloolefin polymer (COP)
Example 44: Cycloolefin copolymer (COC)
Example 45: Polymethylpentene (PMP)
Examples 46 and 61: Polytetrafluoroethylene (PTFE)
Example 47: Polydimethylsilicone (PDMS)
Example 48: Polycarbonate (PC)
Example 49: Polystyrene (PS)
Example 50: Polymethyl methacrylate (PMMA)
Example 51: Polyethylene terephthalate (PET)
Example 52: Hard polyvinyl chloride (PVC)
Example 53: Nylon 6 (PA6)
Example 54: Polyacetal (POM)
Example 55: Polyether ether ketone (PEEK)
Example 56: Liquid crystal polyester (LCP)
Example 57: Polyphenylene sulfide (PPS)
Example 58: Modified polyphenylene ether (m-PPE)
Example 59: Polybutylene terephthalate (PBT)
Example 60: Acrylonitrile-butadiene-styrene (ABS)

All adherend substrates used had a size of 100×25×2.0 mm. Each adherend was used after being wiped with waste cloth. The adhesive composition of the first agent and the second agent mixed with each other was applied to one side of one sheet of each test piece in accordance with JISK-6850 in an environment involving a temperature of 23° C. and a humidity of 50%, and the test piece was immediately bonded to another sheet of the test piece. The thickness of the adhesive agent layer was 0.1 mm. Then, the resultant was cured at room temperature for 24 hours, used as a sample for tensile shear strength measurement, and subjected to the measurement of tensile shear strength (unit: MPa) to determine tensile shear strength. The measurement was performed at a pulling speed of 10 mm/min in an environment involving a temperature of 23° C.

TABLE 1

|  | Reagent | Example 1 | Example 2 | Example 3 | Example 4 | Example 5 | Example 6 | Example 7 | Example 8 |
|---|---|---|---|---|---|---|---|---|---|
| First agent | (A) EHMA | 100 | 100 | 100 | 100 | 100 | 100 | 100 | 100 |
|  | (B) Adhesive polymer 1 | 15 |  |  |  |  |  |  |  |
|  | Adhesive polymer 2 |  | 15 |  |  |  |  |  |  |
|  | Adhesive polymer 3 |  |  | 15 |  |  |  |  |  |
|  | Adhesive polymer 4 |  |  |  | 15 |  |  |  |  |
|  | Adhesive polymer 5 |  |  |  |  | 15 |  |  |  |
|  | Adhesive polymer 6 |  |  |  |  |  | 15 |  |  |
|  | Adhesive polymer 7 |  |  |  |  |  |  | 15 |  |
|  | Adhesive polymer 8 |  |  |  |  |  |  |  | 15 |
|  | (C) Cumene hydroperoxide | 5 | 5 | 5 | 5 | 5 | 5 | 5 | 5 |
| Second agent | (A) EHMA | 100 | 100 | 100 | 100 | 100 | 100 | 100 | 100 |
|  | (B) Adhesive polymer 1 | 15 |  |  |  |  |  |  |  |
|  | Adhesive polymer 2 |  | 15 |  |  |  |  |  |  |
|  | Adhesive polymer 3 |  |  | 15 |  |  |  |  |  |
|  | Adhesive polymer 4 |  |  |  | 15 |  |  |  |  |
|  | Adhesive polymer 5 |  |  |  |  | 15 |  |  |  |
|  | Adhesive polymer 6 |  |  |  |  |  | 15 |  |  |
|  | Adhesive polymer 7 |  |  |  |  |  |  | 15 |  |
|  | Adhesive polymer 8 |  |  |  |  |  |  |  | 15 |
|  | (D) Vanadyl acetylacetonate | 1 | 1 | 1 | 1 | 1 | 1 | 1 | 1 |

TABLE 1-continued

|  | Reagent | Example 1 | Example 2 | Example 3 | Example 4 | Example 5 | Example 6 | Example 7 | Example 8 |
|---|---|---|---|---|---|---|---|---|---|
| Evaluation | Adherend | PP | PP | PP | PP | PP | PP | PP | PP |
|  | Tensile shear adhesive strength/MPa | 1.11 | 1.22 | 2.44 | 2.35 | 1.37 | 1.40 | 1.74 | 1.84 |
|  | Fracture mechanism | Interface | Interface | Material fracture | Interface | Interface | Interface | Interface | Interface |

TABLE 2

|  | Reagent | Example 9 | Example 10 | Example 11 | Example 12 | Example 13 | Example 14 | Example 15 | Example 16 |
|---|---|---|---|---|---|---|---|---|---|
| First agent | (A) EHMA | 100 | 100 | 100 | 100 | 100 | 100 | 100 | 100 |
|  | (B) Adhesive polymer 9 | 15 |  |  |  |  |  |  |  |
|  | Adhesive polymer 10 |  | 15 |  |  |  |  |  |  |
|  | Adhesive polymer 11 |  |  | 15 |  |  |  |  |  |
|  | Adhesive polymer 12 |  |  |  | 15 |  |  |  |  |
|  | Adhesive polymer 13 |  |  |  |  | 15 |  |  |  |
|  | Adhesive polymer 14 |  |  |  |  |  | 15 |  |  |
|  | Adhesive polymer 15 |  |  |  |  |  |  | 15 |  |
|  | Adhesive polymer 16 |  |  |  |  |  |  |  | 15 |
|  | (C) Cumene hydroperoxide | 5 | 5 | 5 | 5 | 5 | 5 | 5 | 5 |
| Second agent | (A) EHMA | 100 | 100 | 100 | 100 | 100 | 100 | 100 | 100 |
|  | (B) Adhesive polymer 9 | 15 |  |  |  |  |  |  |  |
|  | Adhesive polymer 10 |  | 15 |  |  |  |  |  |  |
|  | Adhesive polymer 11 |  |  | 15 |  |  |  |  |  |
|  | Adhesive polymer 12 |  |  |  | 15 |  |  |  |  |
|  | Adhesive polymer 13 |  |  |  |  | 15 |  |  |  |
|  | Adhesive polymer 14 |  |  |  |  |  | 15 |  |  |
|  | Adhesive polymer 15 |  |  |  |  |  |  | 15 |  |
|  | Adhesive polymer 16 |  |  |  |  |  |  |  | 15 |
|  | (D) Vanadyl acetylacetonate | 1 | 1 | 1 | 1 | 1 | 1 | 1 | 1 |
| Evaluation | Adherend | PP | PP | PP | PP | PP | PP | PP | PP |
|  | Tensile shear adhesive strength/MPa | 1.17 | 1.54 | 1.63 | 1.38 | 1.51 | 1.33 | 1.28 | 1.74 |
|  | Fracture mechanism | Interface | Interface | Interface | Interface | Interface | Interface | Interface | Interface |

TABLE 3

|  | Reagent | Example 17 | Example 18 | Example 19 | Example 20 | Example 21 |
|---|---|---|---|---|---|---|
| First agent | (A) )EHMA | 100 | 100 | 100 | 100 | 100 |
|  | (B) Adhesive polymer 17 | 15 |  |  |  |  |
|  | Adhesive polymer 18 |  | 15 |  |  |  |
|  | Adhesive polymer 19 |  |  | 15 |  |  |
|  | Adhesive polymer 20 |  |  |  | 15 |  |
|  | Adhesive polymer 21 |  |  |  |  | 15 |
|  | (C) Cumene hydroperoxide | 5 | 5 | 5 | 5 | 5 |
| Second agent | (A) EHMA | 100 | 100 | 100 | 100 | 100 |
|  | (B) Adhesive polymer 17 | 15 |  |  |  |  |
|  | Adhesive polymer 18 |  | 15 |  |  |  |
|  | Adhesive polymer 19 |  |  | 15 |  |  |
|  | Adhesive polymer 20 |  |  |  | 15 |  |
|  | Adhesive polymer 21 |  |  |  |  | 15 |
|  | (D) Vanadyl acetylacetonate | 1 | 1 | 1 | 1 | 1 |
| Evaluation | Adherend | PP | PP | PP | PP | PP |
|  | Tensile shear adhesive strength/MPa | 1.44 | 2.07 | 1.94 |  | 1.11 |
|  | Fracture mechanism | Interface | Interface | Interface | Interface | Interface |

TABLE 4

| | Reagent | Example 22 | Example 23 | Example 24 | Example 25 |
|---|---|---|---|---|---|
| First agent | (A) MMA | 100 | 100 | 100 | 100 |
| | (B) Adhesive polymer 3 | 15 | 10 | 10 | 10 |
| | (C) Cumene hydroperoxide | 5 | 5 | 5 | 5 |
| Second agent | (A) MMA | 100 | | | |
| | (B) Adhesive polymer 3 | 15 | 10 | 10 | 10 |
| | (D) Vanadyl acetylacetonate | 1 | | | |
| | Cobalt octylate | | 1 | | |
| | Cobalt naphthenate | | | 1 | |
| | Ethylenethiourea | | | | 1 |
| Evaluation | Adherend | PP | PP | PP | PP |
| | Tensile shear adhesive strength/MPa | 1.12 | 0.65 | 0.38 | 1.02 |
| | Fracture mechanism | Interface | Interface | Interface | Interface |

TABLE 5

| | Reagent | Example 26 | Example 27 | Example 28 | Example 29 | Example 30 | Example 31 | Example 32 | Example 33 | Example 34 |
|---|---|---|---|---|---|---|---|---|---|---|
| First agent | (A) EMA | 100 | | | | | | | | |
| | nBMA | | 100 | | | | | | | |
| | iBMA | | | 100 | | | | | | |
| | CHMA | | | | 100 | | | | | |
| | IBOMA | | | | | 100 | | | | |
| | LMA | | | | | | 100 | | | 50 |
| | BzMA | | | | | | | 100 | | |
| | THFMA | | | | | | | | 100 | |
| | iBMA | | | | | | | | | 50 |
| | (B) Adhesive polymer 3 | 15 | 15 | 15 | 15 | 15 | 15 | 15 | 15 | 15 |
| | (C) Cumene hydroperoxide | 5 | 5 | 5 | 5 | 5 | 5 | 5 | 5 | 5 |
| Second agent | (A) EMA | 100 | | | | | | | | |
| | nBMA | | 100 | | | | | | | |
| | iBMA | | | 100 | | | | | | |
| | CHMA | | | | 100 | | | | | |
| | IBOMA | | | | | 100 | | | | |
| | LMA | | | | | | 100 | | | 50 |
| | BzMA | | | | | | | 100 | | |
| | THFMA | | | | | | | | 100 | |
| | iBMA | | | | | | | | | 50 |
| | (B) Adhesive polymer 3 | 15 | 15 | 15 | 15 | 15 | 15 | 15 | 15 | 15 |
| | (D) Vanadyl acetylacetonate | 1 | 1 | 1 | 1 | 1 | 1 | 1 | 1 | 1 |
| Evaluation | Adherend | PP | PP | PP | PP | PP | PP | PP | PP | PP |
| | Tensile shear adhesive strength/MPa | 0.78 | 0.98 | 0.61 | 0.45 | 0.37 | 0.76 | 0.55 | 1.06 | 1.58 |
| | Fracture mechanism | Interface | Interface | Interface | Interface | Interface | Interface | Interface | Interface | Interface |

TABLE 6

| | Reagent | Example 35 | Example 36 | Example 37 | Example 38 | Example 39 | Example 40 |
|---|---|---|---|---|---|---|---|
| First agent | (A) MMA | 100 | | | | | 100 |
| | EHMA | | 100 | 100 | 100 | 100 | |
| | (B) Adhesive polymer 3 | 10 | 15 | 15 | 15 | 15 | 10 |
| | (C) Cumene hydroperoxide | 5 | 5 | 5 | 5 | 5 | 5 |
| | (Others) NBR | 15 | | | | | 10 |
| | SBR | | 10 | | | | 10 |
| | Bis-GMA | | | 5 | | | |
| | TE-2000 | | | | 5 | | |
| | TEAI-1000 | | | | | 5 | |
| Second agent | (A) MMA | 100 | | | | | 100 |
| | EHMA | | 100 | 100 | 100 | 100 | |
| | (B) Adhesive polymer 3 | 10 | 15 | 15 | 15 | 15 | 10 |
| | (D) Vanadyl acetylacetonate | 5 | 5 | 5 | 5 | 5 | 5 |
| | (Others) NBR | 15 | | | | | 10 |
| | SBR | | 10 | | | | 10 |
| | Bis-GMA | | | 5 | | | |

TABLE 6-continued

| Reagent | | Example 35 | Example 36 | Example 37 | Example 38 | Example 39 | Example 40 |
|---|---|---|---|---|---|---|---|
| | TE-2000 | | | | 5 | | |
| | TEAI-1000 | | | | | 5 | |
| Evaluation | Adherend | PP | PP | PP | PP | PP | PP |
| | Tensile shear adhesive strength/MPa | 1.33 | 2.39 | 1.65 | 1.69 | 2.22 | 1.28 |
| | Fracture mechanism | Interface | Material fracture | Interface | Interface | Interface | Interface |

TABLE 7

| | Reagent | Example 41 | Example 42 | Example 43 | Example 44 | Example 45 | Example 46 | Example 47 | Example 48 | Example 49 |
|---|---|---|---|---|---|---|---|---|---|---|
| First agent | (A) EHMA | 100 | 100 | 100 | 100 | 100 | 100 | 100 | 100 | 100 |
| | (B) Adhesive polymer 3 | 15 | 15 | 15 | 15 | 15 | 15 | 15 | 15 | 15 |
| | (C) Cumene hydroperoxide | 5 | 5 | 5 | 5 | 5 | 5 | 5 | 5 | 5 |
| Second agent | (A) EHMA | 100 | 100 | 100 | 100 | 100 | 100 | 100 | 100 | 100 |
| | (B) Adhesive polymer 3 | 15 | 15 | 15 | 15 | 15 | 15 | 15 | 15 | 15 |
| | (D) Vanadyl acetylacetonate | 1 | 1 | 1 | 1 | 1 | 1 | 1 | 1 | 1 |
| Evaluation | Adherend | HDPE | LDPE | COP | COC | PMP | PTFE | PDMS | PC | PS |
| | Tensile shear adhesive strength/MPa | 1.69 | 1.33 | 2.89 | 3.78 | 2.34 | 1.09 | 0.55 | 3.11 | 1.58 |
| | Fracture mechanism | Material fracture | Material fracture | Interface | Interface | Interface | Material fracture | Material fracture | Interface | Material fracture |

TABLE 8

| | Reagent | Example 50 | Example 51 | Example 52 | Example 53 | Example 54 | Example 55 | Example 56 | Example 57 | Example 58 |
|---|---|---|---|---|---|---|---|---|---|---|
| First agent | (A) EHMA | 100 | 100 | 100 | 100 | 100 | 100 | 100 | 100 | 100 |
| | (B) Adhesive polymer 3 | 15 | 15 | 15 | 15 | 15 | 15 | 15 | 15 | 15 |
| | (C) Cumene hydroperoxide | 5 | 5 | 5 | 5 | 5 | 5 | 5 | 5 | 5 |
| Second agent | (A) EHMA | 100 | 100 | 100 | 100 | 100 | 100 | 100 | 100 | 100 |
| | (B) Adhesive polymer 3 | 15 | 15 | 15 | 15 | 15 | 15 | 15 | 15 | 15 |
| | (D) Vanadyl acetylacetonate | 1 | 1 | 1 | 1 | 1 | 1 | 1 | 1 | 1 |
| Evaluation | Adherend | PMMA | PET | PVC | PA6 | POM | PEEK | LCP | PPS | m-PPE |
| | Tensile shear adhesive strength/MPa | 3.47 | 3.07 | 2.09 | 2.87 | 2.11 | 2.88 | 2.27 | 3.26 | 3.78 |
| | Fracture mechanism | Interface | Interface | Interface | Interface | Interface | Interface | Material fracture | Interface | Interface |

TABLE 9

| | Reagent | Example 59 | Example 60 |
|---|---|---|---|
| First agent | (A) EHMA | 100 | 100 |
| | (B) Adhesive polymer 3 | 15 | 15 |
| | (C) Cumene hydroperoxide | 5 | 5 |
| Second agent | (A) EHMA | 100 | 100 |
| | (B) Adhesive polymer 3 | 15 | 15 |
| | (D) Vanadyl acetylacetonate | 1 | 1 |
| Evaluation | Adherend | PBT | ABS |
| | Tensile shear adhesive strength/MPa | 2.76 | 4.02 |
| | Fracture mechanism | Interface | Interface |

TABLE 10

| | Reagent | Comparative Example 1 | Comparative Example 2 | Comparative Example 3 | Comparative Example 4 |
|---|---|---|---|---|---|
| First agent | (A) EHMA | 100 | | | |
| | MMA | | 100 | | |
| | THFMA | | | 100 | |
| | BzMA | | | | 100 |
| | (C) Cumene hydroperoxide | 5 | 5 | 5 | 5 |
| | (Others) SBR | 10 | | | |
| | NBR | | 15 | 15 | 15 |
| Second agent | (A) EHMA | 100 | | | |
| | MMA | | 100 | | |
| | THFMA | | | 100 | |
| | BzMA | | | | 100 |
| | (D) Vanadyl acetylacetonate | 1 | 1 | 1 | 1 |
| | (Others) SBR | 10 | | | |
| | NBR | | 15 | 15 | 15 |
| Evaluation | Adherend | PP | PP | PP | PP |
| | Tensile shear adhesive strength/MPa | 0.78 | 0.22 | 0.29 | 0.13 |
| | Fracture mechanism | Interface | Interface | Interface | Interface |

TABLE 11

| | Reagent | Example 61 |
|---|---|---|
| First agent | (A) EHMA | 100 |
| | (B) Adhesive polymer 3 | 15 |
| | (C) Cumene hydroperoxide | 5 |
| Second agent | (A) EHMA | 100 |
| | (B) Adhesive polymer 3 | 15 |
| | (D) Vanadyl acetylacetonate | 1 |
| Evaluation | Adherend | PTFE |
| | Tensile shear adhesive strength/MPa | 1.13 |
| | Fracture mechanism | Material fracture |

As is evident from the test results, the adhesive composition of the present invention is excellent in adhesion properties for various plastic resins such as low-surface energy resin base materials, for example, polyethylene (PE), polypropylene (PP), polytetrafluoroethylene (PTFE), polyacetal (POM), nylon 6 (PA6), polyethylene terephthalate (PET), polybutylene terephthalate (PBT), polydimethylsilicone (PDMS), polyether ether ketone (PEEK), modified polyphenylene ether (PPE), polyphenylene sulfide (PPS), cycloolefin polymer (COP), cycloolefin copolymer (COC), polymethylpentene (PMP), and liquid crystal polyester (LCP), or high-surface energy resin base materials, for example, polyvinyl chloride (PVC), polycarbonate (PC), and polymethyl methacrylate (PMMA).

The adhesive composition of the present invention is capable of adhering to a wide range of base materials and may assume various composition forms.

The invention claimed is:

1. A two-component adhesive composition comprising the following (A) to (D):
    (A) a radically polymerizable compound;
    (B)
        (B-1) a polymer consisting of at least one repeat unit derived from a polymerizable compound of formula (I), or
        (B-2) a polymer consisting of at least one repeat unit derived from a polymerizable compound of formula (I), and at least one repeat unit derived from another radically polymerizable compound:

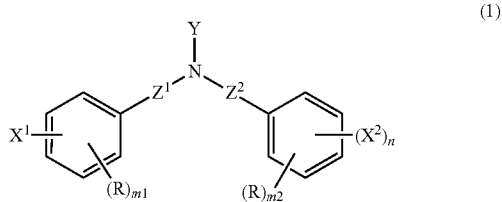

wherein $X^1$ and $X^2$ each independently represent a C7 to C20 alkyl group or a C7 to C20 alkoxy group, n represents 0 or 1, $Z^1$ and $Z^2$ each independently represent a single bond or a C1 to C3 alkylene group, each R independently represents an organic group or a halogeno group, m1 and m2 each independently represent any integer of 0 to 4, and Y represents a polymerizable functional group;
    (C) a polymerization initiator; and
    (D) a reducing agent,
    wherein
        a first component contains at least above (C) and a second component contains at least above (D).

2. The two-component adhesive composition according to claim 1, wherein the polymerization initiator is cumene hydroperoxide.

3. The two-component adhesive composition according to claim 1, wherein the reducing agent is at least one compound selected from the group consisting of vanadyl acetylacetonate, cobalt octylate, cobalt naphthenate and ethylenethiourea.

4. The two-component adhesive composition according to claim 1, wherein the two-component adhesive composition further comprises polybutadiene.

5. A compact obtained by applying the two-component adhesive composition according to claim 1 onto a plastic base material, and curing the two-component adhesive composition so that the resulting layer is disposed on the base material or between base materials.

* * * * *